United States Patent
Xi et al.

(10) Patent No.: US 11,606,275 B2
(45) Date of Patent: Mar. 14, 2023

(54) NETWORK QUALITY MEASUREMENT METHOD AND APPARATUS

(71) Applicant: Huawei Technologies Co., Ltd., Shenzhen (CN)

(72) Inventors: Jiaojiao Xi, Xi'an (CN); Jianwei Guo, Xi'an (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 340 days.

(21) Appl. No.: 16/909,515

(22) Filed: Jun. 23, 2020

(65) Prior Publication Data

US 2020/0322243 A1 Oct. 8, 2020

Related U.S. Application Data

(63) Continuation of application No. PCT/CN2018/124498, filed on Dec. 27, 2018.

(30) Foreign Application Priority Data

Dec. 28, 2017 (CN) .......................... 201711471035.3

(51) Int. Cl.
*H04L 43/0829* (2022.01)
*H04L 43/0852* (2022.01)
(Continued)

(52) U.S. Cl.
CPC ...... *H04L 43/0829* (2013.01); *H04L 43/0852* (2013.01); *H04L 43/0876* (2013.01);
(Continued)

(58) Field of Classification Search
CPC ............. H04L 43/0829; H04L 43/0852; H04L 43/0876; H04L 43/16; H04L 47/10
See application file for complete search history.

(56) References Cited

U.S. PATENT DOCUMENTS

| | | | | |
|---|---|---|---|---|
| 2014/0297805 A1* | 10/2014 | Chaplot | .................. | H04L 65/65 709/219 |
| 2017/0180329 A1 | 6/2017 | Lin et al. | | |
| 2019/0116535 A1* | 4/2019 | Szilagyi | .............. | H04W 72/087 |

FOREIGN PATENT DOCUMENTS

| | | |
|---|---|---|
| CN | 101340441 A | 1/2009 |
| CN | 101378337 A | 3/2009 |

(Continued)

OTHER PUBLICATIONS

Junjun, M., "Design of Digital TV RF Signal Power Detector Based on ARM," Electronic Measurement, Sep. 24, 2014, 5 pages.

*Primary Examiner* — Siming Liu
(74) *Attorney, Agent, or Firm* — Conley Rose, P.C.

(57) ABSTRACT

A network quality measurement method includes obtaining feature parameter of a to-be-measured data packet set, where the to-be-measured data packet set is in a packet flow and is based on an encrypted transmission protocol, the to-be-measured data packet set includes at least two to-be-measured data packets, and the feature parameter are parameter read from headers of the to-be-measured data packets based on the encrypted transmission protocol, determining a data transmission mode of the to-be-measured data packet set based on the feature parameter of the to-be-measured data packet set, determining, based on the data transmission mode, a measurement index of network quality measurement, and performing, based on the measurement index, the network quality measurement on the to-be-measured data packets corresponding to the feature parameter.

20 Claims, 6 Drawing Sheets

(51) Int. Cl.
*H04L 43/0876* (2022.01)
*H04L 43/16* (2022.01)
*H04L 47/10* (2022.01)
*H04W 24/08* (2009.01)

(52) U.S. Cl.
CPC .............. *H04L 43/16* (2013.01); *H04L 47/10* (2013.01); *H04W 24/08* (2013.01)

(56) References Cited

FOREIGN PATENT DOCUMENTS

| | | | |
|---|---|---|---|
| CN | 103427935 | A | 12/2013 |
| CN | 105553758 | A | 5/2016 |
| CN | 106161144 | A | 11/2016 |
| CN | 106210924 | A | 12/2016 |
| CN | 108156056 | A | 6/2018 |
| EP | 1513356 | A2 | 3/2005 |
| JP | 2017143336 | A | 8/2017 |
| WO | 2016119822 | A1 | 8/2016 |
| WO | 2016169600 | A1 | 10/2016 |
| WO | 2016173635 | A1 | 11/2016 |
| WO | 2017167392 | A1 | 10/2017 |

\* cited by examiner

NETWORK QUALITY MEASUREMENT METHOD AND APPARATUS

CROSS-REFERENCE TO RELATED APPLICATIONS

This application is a continuation of International Patent Application No. PCT/CN2018/124498, filed on Dec. 27, 2018, which claims priority to Chinese Patent Application No. 201711471035.3, filed on Dec. 28, 2017. The disclosures of the aforementioned applications are hereby incorporated by reference in their entireties.

TECHNICAL FIELD

Embodiments of this application relate to the field of data processing technologies, and specifically, to a network quality measurement method and apparatus.

BACKGROUND

Transmission protocols on a network may be classified into a non-encrypted transmission protocol and an encrypted transmission protocol. The non-encrypted transmission protocol includes a common Transmission Control Protocol (TCP) and User Datagram Protocol (UDP), and the like. The encrypted transmission protocol includes a Quick UDP Internet Connections (QUIC) protocol and the like.

QUIC is a multi-stream concurrent connections transmission protocol that is provided by GOOGLE and that is an improvement of the UDP transmission protocol. A design objective of QUIC is to decrease a network communication delay in the TCP, and provide data transmission security equivalent to encryption of Transport Layer Security (TLS)/Secure Sockets Layer (SSL). In other words, QUIC is equivalent to UDP-based Hypertext Transfer Protocol (HTTP)/HTTP 2.0+TLS/SSL.

As a new transmission protocol, QUIC has a connection-oriented reliable transmission feature similar to that of the TCP, for example, an acknowledgement mechanism, a retransmission and lost packet recovery mechanism, and a congestion control mechanism. In addition, QUIC has a connectionless and low-delay feature of the UDP, for example, a zero round-trip time (RTT) handshake. However, due to an encryption feature of QUIC, all previous TCP/UDP-based measurement methods of basic network quality cannot meet a quality evaluation requirement of QUIC. Measurement of basic network quality may include RTT measurement, packet loss measurement, packet out-of-order measurement, and the like.

Currently, the QUIC protocol is mainly applied to a video playback application program, an audio playback application program, a browser application program, and a video call application program, and may be applied to more application programs in the future. When an application range of the QUIC protocol is increasingly large, how to measure network quality that is based on the QUIC protocol is an urgent problem to be resolved.

SUMMARY

A technical problem to be resolved in embodiments of this application is to provide a network quality measurement method and apparatus, to measure network quality based on an encrypted transmission protocol, for example, to measure network quality based on the QUIC protocol.

A first aspect of the embodiments of this application provides a network quality measurement method, including obtaining feature parameter of a to-be-measured data packet set, where the to-be-measured data packet set is in a packet flow and is based on an encrypted transmission protocol, the to-be-measured data packet set includes at least two to-be-measured data packets, and the feature parameter are parameter read from headers of the to-be-measured data packets based on the encrypted transmission protocol, determining a data transmission mode of the to-be-measured data packet set based on the feature parameter of the to-be-measured data packet set, determining, based on the data transmission mode, a measurement index of network quality measurement, and caching the feature parameter of the to-be-measured data packet set, and performing, based on the measurement index, the network quality measurement on the to-be-measured data packets corresponding to the cached feature parameter.

In the first aspect of the embodiments of this application, the network quality measurement is performed by determining the data transmission mode of the to-be-measured data packets that are based on the encrypted transmission protocol such that a technical problem of how to measure network quality based on the encrypted transmission protocol is resolved, and network quality measurement based on the encrypted transmission protocol is implemented. The data transmission mode is determined based on the feature parameter, without decrypting the to-be-measured data packets that are based on the encrypted transmission protocol such that a measurement process can be simplified.

The encrypted transmission protocol may be the QUIC protocol, and network quality measurement based on the QUIC protocol can be implemented using the method provided in the first aspect.

The feature parameter may include but are not limited to at least one of a packet size, a packet direction, a packet number, a packet number length, a packet arrival time, and an uplink-downlink packet exchange transmit frequency. The feature parameter are parameter read from headers based on the QUIC protocol, and may be used to determine packet type, to determine the data transmission mode. A difference between the feature parameter and parameter read from a header based on a TCP protocol lies in that the feature parameter include no acknowledgement number (ACK). Therefore, the data transmission mode needs to be determined, and further the network quality measurement is performed.

The at least two to-be-measured data packets included in the to-be-measured data packet set include a first to-be-measured data packet and at least one second to-be-measured data packet. Packet arrival times of the at least two to-be-measured data packets are continuous, and a packet arrival time of the at least one second to-be-measured data packet is earlier than a packet arrival time of the first to-be-measured data packet. That is, the packet arrival time of the at least one second to-be-measured data packet is earlier than the packet arrival time of the first to-be-measured data packet. It may be understood that the first to-be-measured data packet is a data packet currently obtained from the packet flow, and the second to-be-measured data packet is a data packet previously obtained from the packet flow.

The to-be-measured data packets corresponding to the cached feature parameter not only include the to-be-measured data packet set, but also include other to-be-measured data packets. The other to-be-measured data packets may be cached previously based on a procedure of the to-be-measured data packet set.

In a possible implementation, the data transmission mode of the to-be-measured data packet set is determined based on the feature parameter of the to-be-measured data packets included in the to-be-measured data packet set. Packet type of the to-be-measured data packets are first determined based on the feature parameter of the to-be-measured data packets, and then the data transmission mode of the to-be-measured data packet set is determined based on the feature parameter and the packet type of the to-be-measured data packets. The to-be-measured data packets are based on the QUIC protocol, and the packet type of the to-be-measured data packets cannot be directly determined. Therefore, the packet type of the to-be-measured data packets are determined based on the feature parameter and definitions of the packet type, to determine the data transmission mode.

The packet type may be classified into a quasi request packet, an application data packet, and a quasi acknowledgement packet. The quasi request packet is a data packet that is sent by a data receive end to a data transmit end and requests to transmit application data and whose packet size is less than a first threshold. The application data packet is a data packet that is sent by the data transmit end to the data receive end and carries the application data and whose packet size is greater than a second threshold. The quasi acknowledgement packet is a data packet that is sent by the data receive end to the data transmit end and indicates that the data receive end receives the application data packet and whose packet size is less than a third threshold. Both the first threshold and the third threshold are less than the second threshold. For ease of differentiation, the first threshold and the second threshold are usually different.

In a possible implementation, the feature parameter and the packet type of the to-be-measured data packets are matched with a preset data transmission mode determining rule, and the data transmission mode of the to-be-measured data packet set is determined based on a matching result. The preset data transmission mode determining rule is obtained by analyzing a plurality of sample quasi request packets, a plurality of sample application data packets, and a plurality of sample quasi acknowledgement packets, to determine the data transmission mode of the to-be-measured data packet set, further determine the measurement index, and further perform the network quality measurement.

In a possible implementation, the preset data transmission mode determining rule indicates that there is a packet loss feature in a data packet set, and the packet loss feature is that packet numbers of two application data packets having continuous packet arrival times are discontinuous. If there is the packet loss feature in the to-be-measured data packet set, the data transmission mode of the to-be-measured data packet set may be determined as a packet loss transmission mode, that is, there is packet loss in the to-be-measured data packet set. Further, the measurement index of the network quality measurement may be determined as the packet loss feature in the packet loss transmission mode, that is, a packet loss rate may be calculated based on the packet loss feature. The packet loss rate is a type of the network quality, and therefore a packet loss rate based on the QUIC protocol can be calculated.

In a possible implementation, if the data transmission mode is the packet loss transmission mode, a quantity of packet loss feature in the to-be-measured data packets corresponding to the cached feature parameter are collected, that is, a quantity of packet losses in the to-be-measured data packets corresponding to the cached feature parameter are collected. One packet loss feature may correspond to one packet loss. The packet loss rate may be calculated based on the quantity of packet loss feature. The packet loss rate may be calculated by dividing the quantity of packet loss feature by a quantity of application data packets in the to-be-measured data packets corresponding to the cached feature parameter.

In a possible implementation, the preset data transmission mode determining rule indicates that a data packet set has an out-of-order feature, and the out-of-order feature is a packet number of a first application data packet being greater than a packet number of a second application data packet, packet arrival times of the first application data packet and the second application data packet being continuous, and the packet arrival time of the first application data packet being less than the packet arrival time of the second application data packet. If the to-be-measured data packet set has the out-of-order feature, it may be determined that the data transmission mode of the to-be-measured data packet set is an out-of-order transmission mode, that is, it may be determined that disorder occurs in the to-be-measured data packet set. Further, the out-of-order feature may be determined as the measurement index of the network quality measurement in the out-of-order transmission mode, that is, an out-of-order rate may be calculated based on the out-of-order feature. The out-of-order rate is a type of the network quality, and therefore an out-of-order rate based on the QUIC protocol can be calculated.

In a possible implementation, if the data transmission mode is the out-of-order transmission mode, a quantity of out-of-order feature in the to-be-measured data packets corresponding to the cached feature parameter are collected, that is, a quantity of out-of-order times in the to-be-measured data packets corresponding to the cached feature parameter are collected. One out-of-order feature may correspond to one time of disorder. The out-of-order rate may be calculated based on the quantity of out-of-order feature. The out-of-order rate may be calculated by dividing the quantity of out-of-order feature by the quantity of application data packets in the to-be-measured data packets corresponding to the cached feature parameter.

In a possible implementation, the preset data transmission mode determining rule indicates that a data packet set has a response feature, and the response feature is that there is a quasi acknowledgement packet and an application data packet corresponding to the quasi acknowledgement packet. If the to-be-measured data packet set has the response feature, it may be determined that the data transmission mode of the to-be-measured data packet set is a response transmission mode, that is, it may be determined that there is a data transmission response in the to-be-measured data packet set. Further, the response feature may be determined as the measurement index of the network quality measurement in the response transmission mode, that is, a delay may be calculated based on the response feature. The delay is a type of the network quality, and therefore a delay based on the QUIC protocol can be calculated.

In a possible implementation, if the data transmission mode is the response transmission mode, a quantity of response feature in the to-be-measured data packets corresponding to the cached feature parameter are collected, and a packet arrival time difference between a quasi acknowledgement packet in each response feature and an application data packet corresponding to the quasi acknowledgement packet is calculated. Finally, a delay is calculated based on the quantity of response feature and the packet arrival time differences corresponding to all response feature. That is, the packet arrival time differences corresponding to all response feature are accumulated. The delay is calculated by dividing an accumulated sum by the quantity of response feature.

In a possible implementation, when the network quality measurement is performed, based on the measurement index, on the to-be-measured data packets corresponding to the cached feature parameter, the network quality measurement may be performed, based on the measurement index, on all the to-be-measured data packets corresponding to all the cached feature parameter, that is, an overall packet loss rate, out-of-order rate, and delay are calculated, the network quality measurement may be performed, based on the measurement index, on some of all the to-be-measured data packets corresponding to all the cached feature parameter, that is, a partial packet loss rate, out-of-order rate, and delay are calculated, and the network quality measurement may be performed, based on the measurement index, on a to-be-measured data packet corresponding to a feature parameter cached within a preset time period, that is, a packet loss rate, an out-of-order rate, and a delay within a period of time are calculated. Network quality measurement can be performed on to-be-measured data packets with different bases, and flexibility and selectivity of the network quality measurement can be improved.

In a possible implementation, when the feature parameter of the to-be-measured data packet set are obtained, feature identifiers of the to-be-measured data packets may be further obtained. The feature identifiers are used to identify a service category, an application category, a user category, and the like of the to-be-measured data packets, and may include at least one of identifiers such as a service identifier, an application identifier, and a user identifier. When the feature identifiers of the to-be-measured data packets are obtained, the feature parameter of the to-be-measured data packets are cached into cache locations corresponding to the feature identifiers of the to-be-measured data packets. That is, the feature parameter of the to-be-measured data packets are cached pertinently, to perform network quality measurement pertinently, for example, perform network quality measurement on to-be-measured data packets of a same service.

In a possible implementation, when the feature identifiers of the to-be-measured data packets are obtained, to-be-measured data packets having a same feature identifier may be obtained from the to-be-measured data packets corresponding to the cached feature parameter, and network quality measurement is performed, based on the measurement index, on the to-be-measured data packets having the same feature identifier, to implement pertinent network quality measurement.

A second aspect of the embodiments of this application provides a network quality measurement apparatus. The network quality measurement apparatus has functions of implementing the method provided in the first aspect. The functions may be implemented by hardware, or may be implemented by hardware executing corresponding software. The hardware or the software includes one or more modules corresponding to the foregoing functions.

In a possible implementation, the network quality measurement apparatus includes an obtaining unit configured to obtain feature parameter of a to-be-measured data packet set, where the to-be-measured data packet set is in a packet flow and is based on an encrypted transmission protocol, the to-be-measured data packet set includes at least two to-be-measured data packets, and the feature parameter are parameter read from headers of the to-be-measured data packets based on the encrypted transmission protocol, a determining unit configured to determine a data transmission mode of the to-be-measured data packet set based on the feature parameter of the to-be-measured data packet set, where the determining unit is further configured to determine, based on the data transmission mode, a measurement index of network quality measurement, a cache unit configured to cache the feature parameter of the to-be-measured data packet set, and a measurement unit configured to perform, based on the measurement index, the network quality measurement on to-be-measured data packets corresponding to the cached feature parameter.

In a possible implementation, the network quality measurement apparatus includes a processor, a memory, an input device, and an output device. The memory stores a computer program, the computer program includes a program instruction, and the processor is configured to invoke the program instruction to perform the following operations obtaining feature parameter of a to-be-measured data packet set, where the to-be-measured data packet set is in a packet flow and is based on an encrypted transmission protocol, the to-be-measured data packet set includes at least two to-be-measured data packets, and the feature parameter are parameter read from headers of the to-be-measured data packets based on the encrypted transmission protocol, determining a data transmission mode of the to-be-measured data packet set based on the feature parameter of the to-be-measured data packet set, determining, based on the data transmission mode, a measurement index of network quality measurement, and caching the feature parameter of the to-be-measured data packet set, and performing, based on the measurement index, the network quality measurement on to-be-measured data packets corresponding to the cached feature parameter.

For a problem-resolving principle and beneficial effects of the apparatus, refer to the method according to the first aspect and beneficial effects brought by the method. Therefore, for implementation of the apparatus, refer to implementation of the method. Repeated content is not described again.

A third aspect of the embodiments of this application provides a computer-readable storage medium. The computer-readable storage medium stores an instruction. When the instruction is run on a computer, the computer is enabled to perform the method according to the first aspect.

A fourth aspect of the embodiments of this application provides a computer program product including an instruction. When the computer program product is run on a computer, the computer is enabled to perform the method according to the first aspect.

BRIEF DESCRIPTION OF DRAWINGS

To describe the technical solutions in the embodiments of this application or in the background more clearly, the following describes the accompanying drawings required for describing the embodiments of this application or the background.

DESCRIPTION OF EMBODIMENTS

The following describes, with reference to the accompanying drawings, a network quality measurement method and apparatus that are provided in the embodiments of this application.

Figure 1:
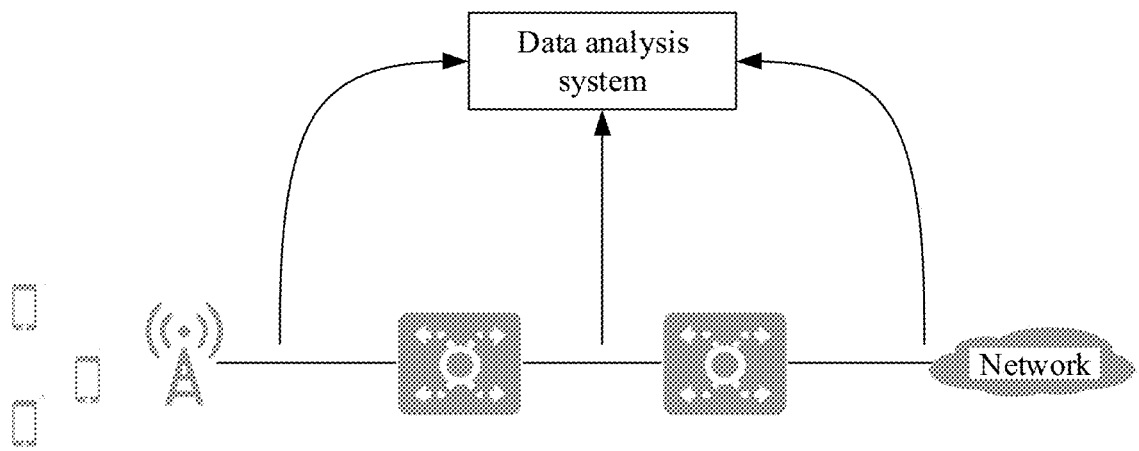
FIG. 1 is a schematic diagram of a system architecture according to an embodiment of this application.

FIG. 1 is a schematic diagram of a system architecture according to an embodiment of this application. The schematic diagram of the system architecture shown in FIG. 1 may be a schematic diagram of a system architecture of a data analysis system on a carrier network side. A terminal device accesses a network (Internet) or a server over an access network, a core network, or a transport network. The data analysis system may collect, analyze, and process information sent by the terminal device to the network (Internet) or the server, and collect, analyze, and process information sent by the network or the server to the terminal device. In other words, the data analysis system collects, analyzes, and processes information transmitted between the terminal device and the network or the server. The data analysis system is mainly used for application service quality assessment or user perception quality management, and is configured to measure network quality in the embodiment of this application. The network quality may include a delay, a packet loss rate, or an out-of-order rate, and the like.

A device corresponding to the data analysis system may be placed in a carrier equipment room and managed by related personnel. The data analysis system may correspond to one device, that is, one device acquires, analyzes, and processes the information, outputs a result, and so on, or the data analysis system may correspond to a plurality of devices, for example, one device is configured to acquire the information, one device is configured to analyze and process the information, and one device is configured to output a result. Forms and a quantity of devices corresponding to the data analysis system are not limited in the embodiments of this application.

Figure 2:
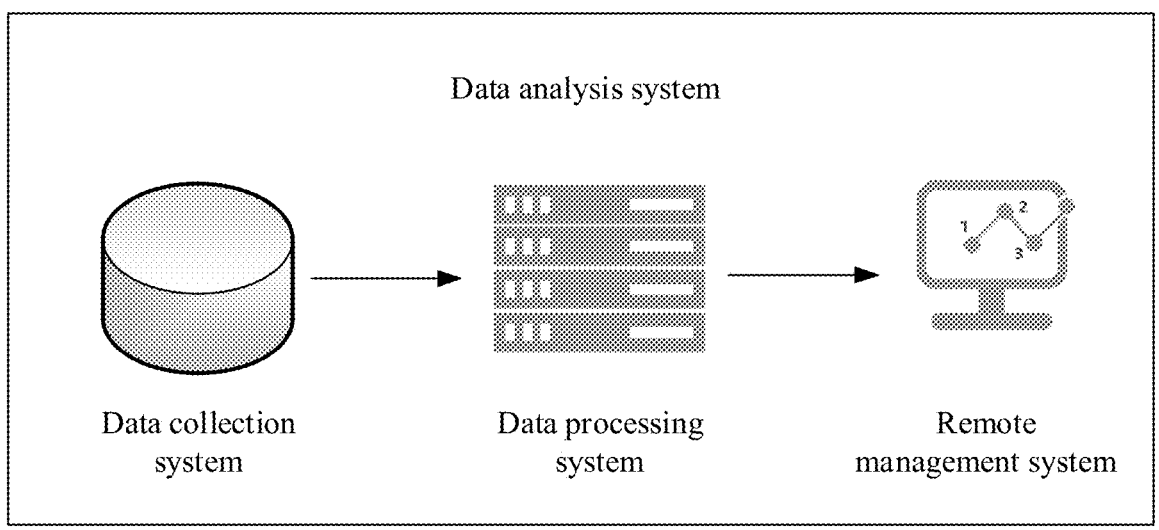
FIG. 2 is a schematic structural diagram of a data analysis system shown in FIG. 1.

Assuming that the data analysis system corresponds to a plurality of devices, for the schematic structural diagram of the data analysis system shown in FIG. 1, refer to FIG. 2. The data analysis system may include a data collection system, a data processing system, and a remote management system. The three systems may respectively correspond to one device. The data collection system is configured to collect information transmitted between a terminal device and a network or a server, and transmit the collected information to the data processing system, and the data processing system analyzes and processes the collected information. The data processing system may transmit a processing result to the remote management system, and the remote management system outputs the processing result (for example, a measurement result) in a form of a graph or the like.

The terminal device is also referred to as user equipment (UE), a mobile station (MS), a mobile terminal (MT), or the like, and is a device that provides voice and/or data connectivity for a user, for example, a handheld device, a vehicle-mounted device, or the like that has a wireless connection function. Currently, some examples of a terminal are a mobile phone, a tablet computer, a notebook computer, a palmtop computer, a mobile Internet device (MID), a wearable device, a virtual reality (VR) device, an augmented reality (AR) device, a wireless terminal in industrial control, a wireless terminal in self driving, a wireless terminal in remote medical surgery, a wireless terminal in smart grid, a wireless terminal in transportation safety, a wireless terminal in a smart city, a wireless terminal in a smart home, and the like.

The network quality measurement apparatus in the embodiments of this application may be the foregoing data analysis system. In the embodiments of this application, an example in which the data analysis system corresponds to one device is used, and the network quality measurement apparatus is the device.

The following compares features of a QUIC packet, a TCP packet, and a UDP packet. Refer to Table 1 below.

TABLE 1

| Comparison item | QUIC packet | TCP packet | UDP packet |
| --- | --- | --- | --- |
| Security | Encrypted, the packet being unreadable | Non-encrypted, the packet being readable | Non-encrypted, the packet being readable |
| Link establishment and release delay | Support zero-delay link establishment, no link release | Three-way handshake and four-way wave | No link establishment and release |
| Slow start | None | Slow start and a bandwidth throughput being affected | None |
| Retransmission and lost packet recovery | Application layer assurance mechanism | Transport layer assurance mechanism | None |
| Multiplexing | Support a connection and multiplexing | Head-of-line blocking problem | None |

Figure 3:
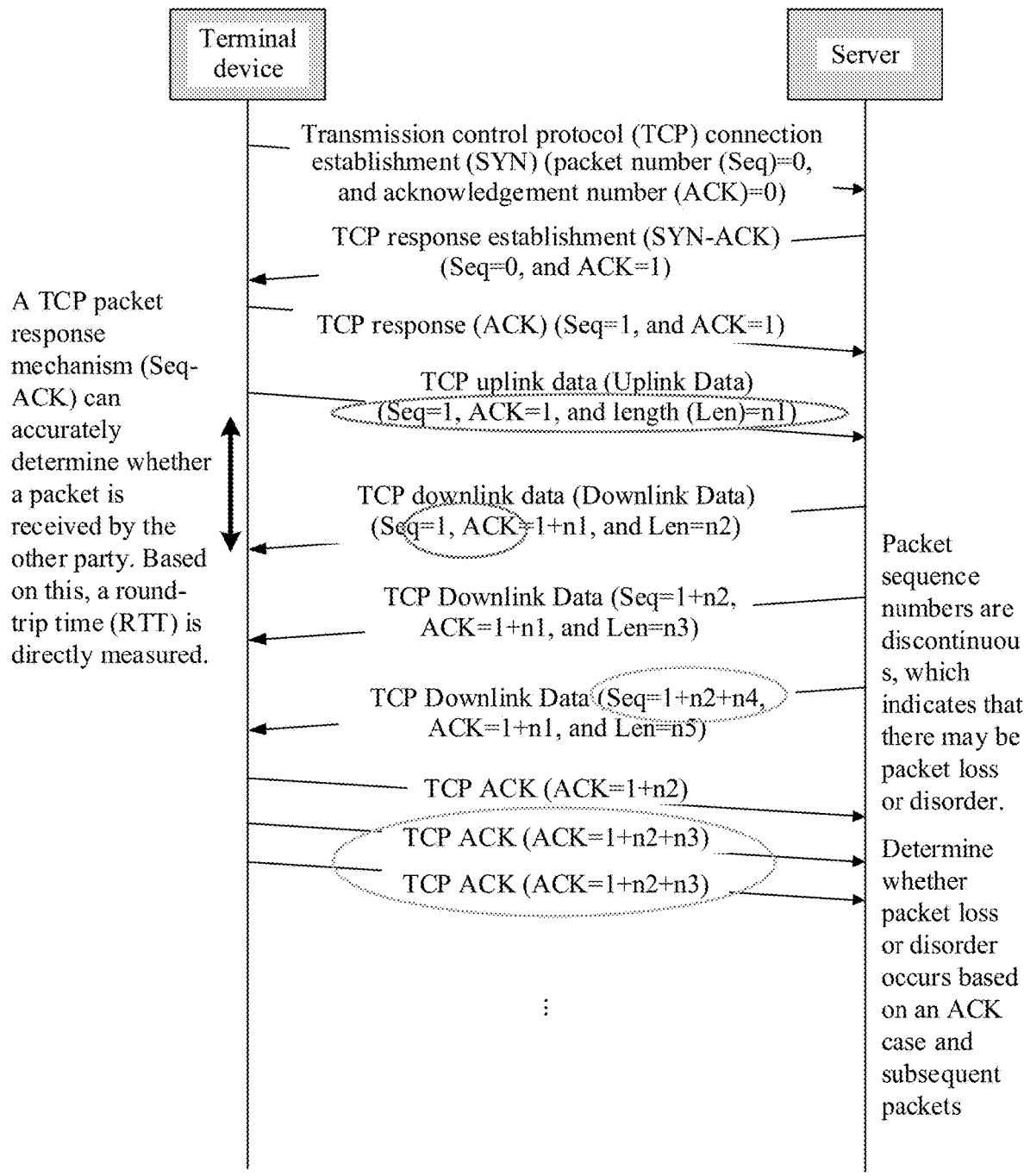
FIG. 3 is a schematic diagram of a measurement principle in a current network quality measurement method.

A current network quality measurement method is for the TCP packet. In the method, network quality measurement is mainly performed by evaluating packet loss, retransmission, and an RTT of the TCP packet. For a measurement principle in the method, refer to FIG. 3. A TCP packet number (seq)

indicates a number of a first byte of data sent by the packet. In a TCP connection, each byte of a transmitted byte stream is numbered in sequence. An ACK indicates a number of the first piece of byte data of a next packet segment that a data receive end expects to receive from a data transmit end. A TCP packet header carries a packet number and an ACK that are readable in plaintext such that an RTT of the TCP packet can be directly measured, and a retransmission status of a lost packet of a service can be measured based on a TCP retransmission and a lost packet recovery mechanism.

The QUIC packet is based on an encrypted transmission protocol, that is, a QUIC packet header does not carry an ACK, and the foregoing network quality measurement method is for a TCP. Therefore, the network quality measurement method is not applicable to network quality measurement that is based on the QUIC protocol. In view of this, the embodiments of this application provide a network quality measurement method and apparatus, to implement the network quality measurement that is based on the QUIC protocol, and further implement network quality measurement that is based on the encrypted transmission protocol.

In the embodiments of this application, based on descriptions of the QUIC protocol, network quality measurement is performed using a request response mechanism for connection-based reliable data transmission as a reference. In QUIC, data transmission is controlled over an application layer. Although control information ciphertext is unreadable after the application layer is encrypted, the application layer still essentially meets a TCP mechanism, for example, application data packet arrival acknowledgement, congestion control, and control of retransmission of a lost packet.

The request response mechanism means that for each QUIC application data packet sent by the data transmit end, the data receive end sends a corresponding response packet to indicate whether the QUIC application data packet is normally received. Once packet loss occurs, in QUIC, the application data packet is retransmitted in a manner of forward error correction or re-encapsulation.

Different from the TCP packet number, a QUIC packet number (PKN) indicates a quantity of packets that have been sent within a determined range (for example, 0 to 255 packets). The packet number does not represent a total quantity of packets that have been sent by the data transmit end. The data transmit end and the data receive end separately count the packet number, and there is no correspondence.

Figure 4:
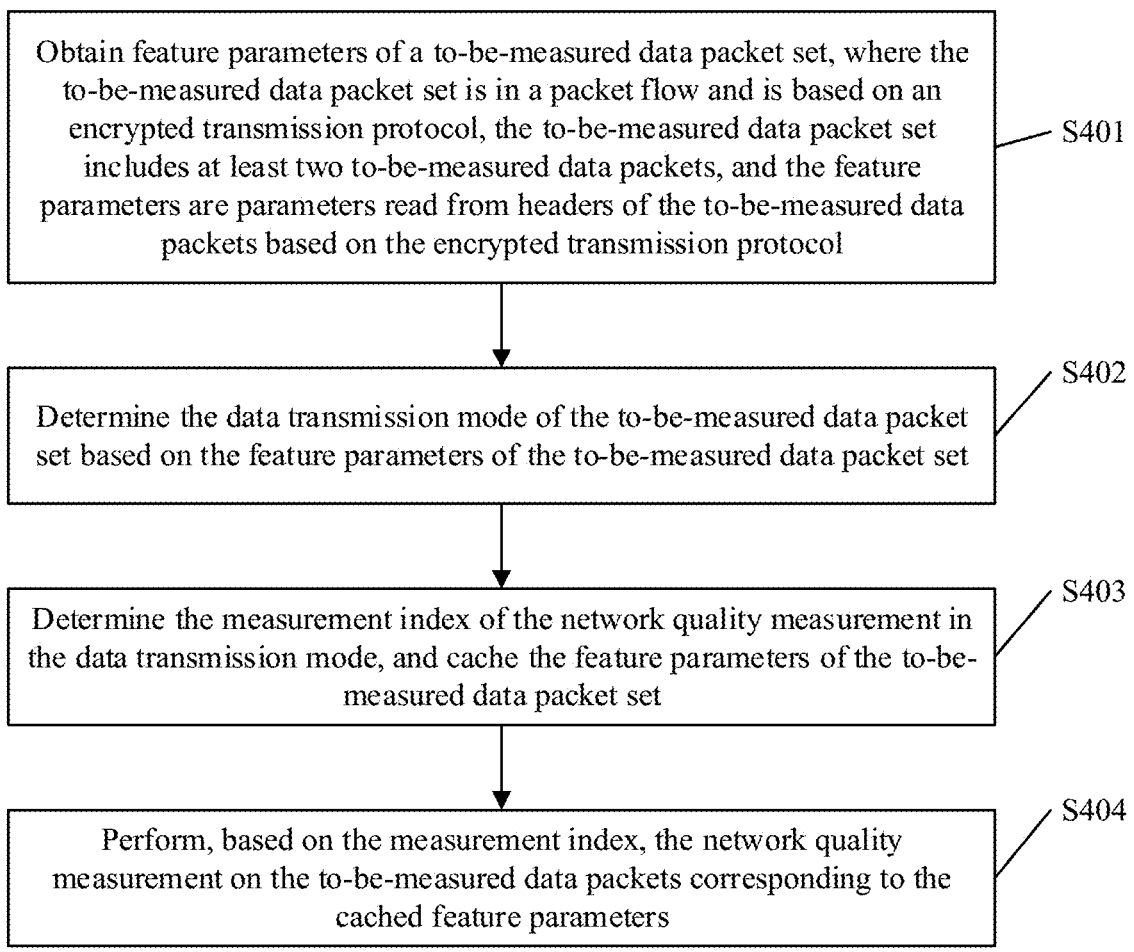
FIG. 4 is a schematic flowchart of a network quality measurement method according to an embodiment of this application.
Figure 5:
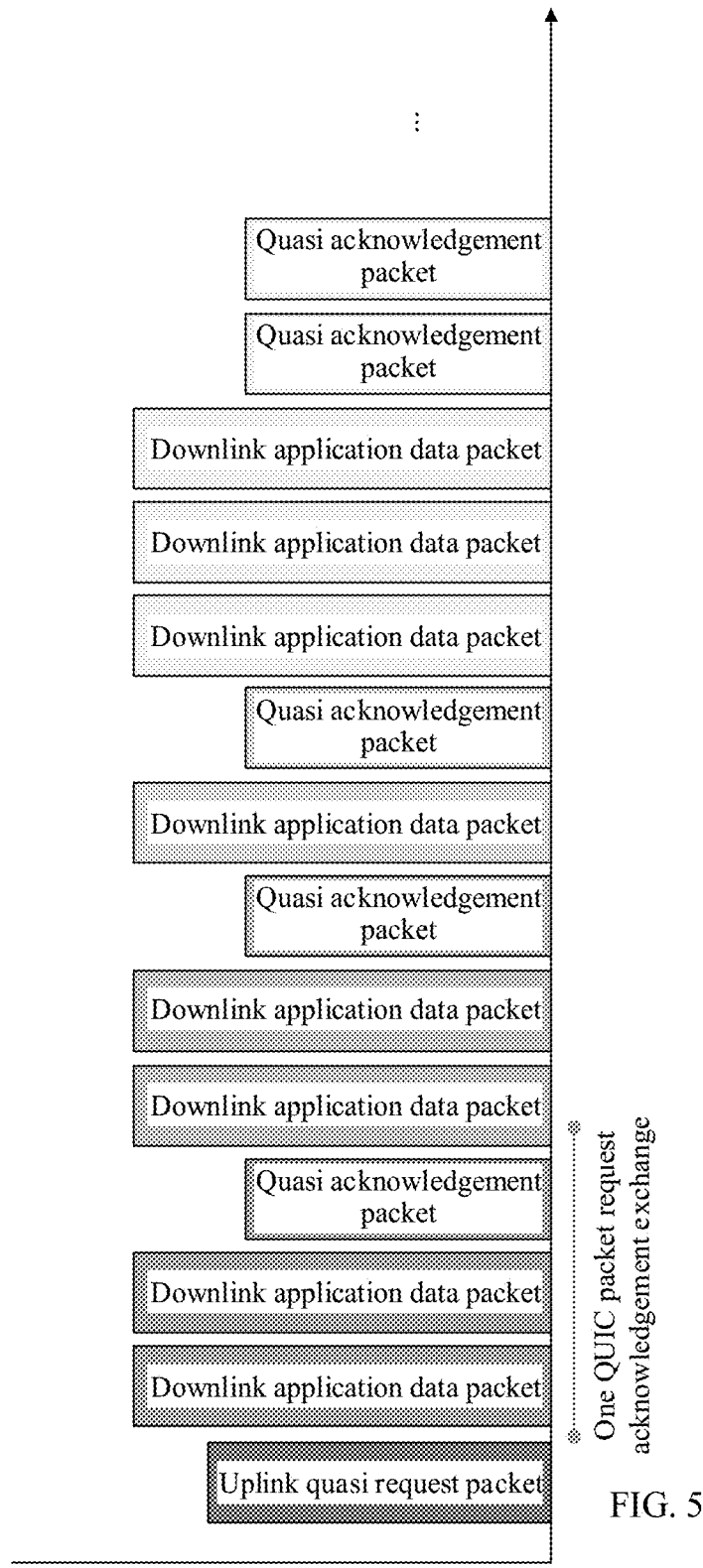
FIG. 5 is a schematic diagram of a QUIC data transmission principle according to an embodiment of this application.
Figure 6:
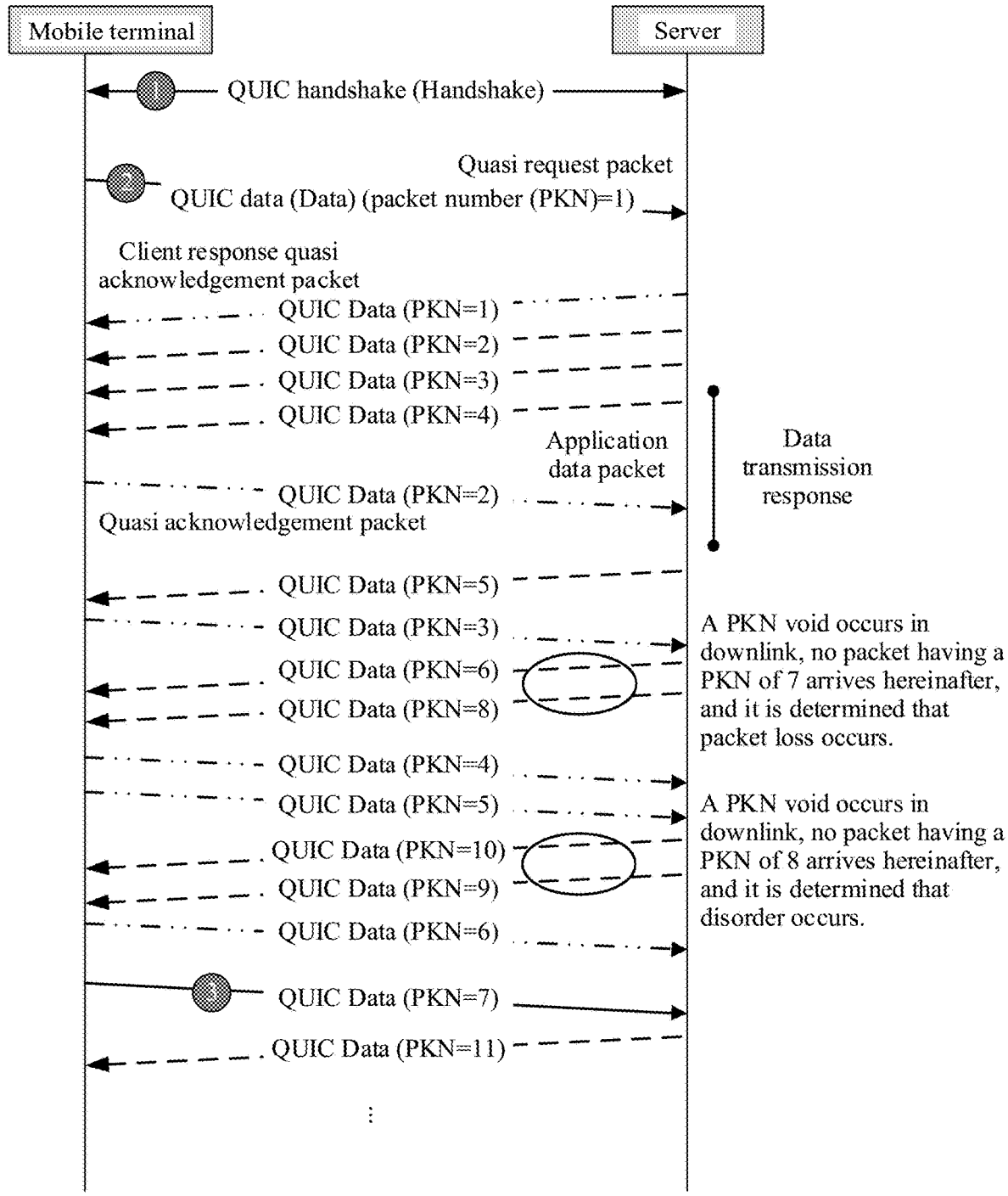
FIG. 6 is a schematic diagram of a measurement principle in a network quality measurement method according to an embodiment of this application.

The following describes, with reference to FIG. 4 to FIG. 6, the network quality measurement method provided in the embodiments of this application in detail.

FIG. 4 is a schematic flowchart of a network quality measurement method according to an embodiment of this application. The method may include but is not limited to the following steps.

Step S401. Obtain feature parameter of a to-be-measured data packet set, where the to-be-measured data packet set is in a packet flow and is based on an encrypted transmission protocol, the to-be-measured data packet set includes at least two to-be-measured data packets, and the feature parameter are parameter read from headers of the to-be-measured data packets based on the encrypted transmission protocol.

Before obtaining the to-be-measured data packet set that is in the packet flow and that is based on the encrypted transmission protocol, the network quality measurement apparatus collects a packet flow between a terminal device and a server. Specifically, the network quality measurement apparatus may collect the packet flow using the data collection system shown in FIG. 2. The network quality measurement apparatus may acquire and obtain carrier channel traffic in a manner of optical splitting or being embedded in a primary device, that is, acquire and obtain the packet flow between the terminal device and the server. The primary device may be an access network device or a server device.

The packet flow between the terminal device and the server includes data packets. The data packets may be based on the QUIC protocol, or may be based on the TCP protocol, or may be based on another protocol. The network quality measurement apparatus performs QUIC identification on the data packets in the collected packet flow, to identify whether the data packets are based on the QUIC protocol, that is, identify whether the data packets are QUIC data packets. The network quality measurement apparatus may perform QUIC protocol identification on the data packets in the packet flow using but not limited to detection and parsing technologies such as a 5-tuple, a transport layer character string, an application layer character string, a server name, a specific message, and a state transition mechanism. The network quality measurement apparatus performs identification based on a form of a flow. In an embodiment, when collecting a data packet, the network quality measurement apparatus performs QUIC protocol identification on the data packet, and when collecting a next data packet, the network quality measurement apparatus performs QUIC protocol identification on the data packet.

The 5-tuple refers to five elements a source Internet Protocol (IP) address, a source port, a destination IP address, a destination port, and a transport layer protocol. A transport layer protocol of a data packet may be obtained by parsing a 5-tuple of the data packet, and further whether the data packet is based on the QUIC protocol can be identified.

In a possible implementation, when performing QUIC identification on a data packet, the network quality measurement apparatus may further perform, on the data packet based on the QUIC protocol, service identification, application granularity identification, user identification, and the like. The service identification is used to identify a service type carried in a QUIC data packet, for example, a video service. The application granularity identification is used to identify an application carried in the QUIC data packet, for example, the application YOUKU. The user identification is used to identify a terminal device or a user account that corresponds to the QUIC data packet.

The network quality measurement apparatus obtains the feature parameter of the to-be-measured data packet set, where the to-be-measured data packet set is in the packet flow and is based on the QUIC protocol. That is, The network quality measurement apparatus obtains the feature parameter of the to-be-measured data packets included in the to-be-measured data packet set.

The feature parameter are parameter read from headers of the to-be-measured data packets based on the QUIC protocol, and may include but is not limited to at least one of a packet size, a packet direction, a packet number, a packet number length, a packet arrival time, or an uplink-downlink packet exchange transmit frequency, and the like. The packet direction is used to indicate uplink or downlink. If a data packet is a QUIC data packet, the packet number is a PKN. For an uplink data packet or a downlink data packet, the packet number and the packet number length are used to measure a packet loss rate and an out-of-order rate. The packet size, the packet direction, the packet arrival time, and the uplink-downlink packet exchange transmit frequency are used to measure a response delay of data transmission. If more parameter can be obtained to improve accuracy of feature extraction, parameter may be added. A difference between the feature parameter and parameter read from a header based on the TCP protocol lies in that the feature parameter include no ACK. Therefore, network quality measurement cannot be directly performed based on the parameter read from the header, a data transmission mode needs to be determined, and further the network quality measurement is performed.

The to-be-measured data packet set includes the at least two to-be-measured data packets. The at least two to-be-measured data packets include a first to-be-measured data packet and at least one second to-be-measured data packet. Packet arrival times of the at least two to-be-measured data packets are continuous, and a packet arrival time of the at least one second to-be-measured data packet is earlier than a packet arrival time of the first to-be-measured data packet. That is, the packet arrival time of the at least one second to-be-measured data packet is earlier than the packet arrival time of the first to-be-measured data packet. It may be understood that the first to-be-measured data packet is a data packet currently obtained from the packet flow, and the second to-be-measured data packet is a data packet previously obtained from the packet flow. A specific quantity of the at least one second to-be-measured data packet is not limited in this embodiment of this application, and depends on a specific case.

For example, the network quality measurement apparatus sequentially obtains, from the packet flow, a to-be-measured data packet 1, a to-be-measured data packet 2, a to-be-measured data packet 3, and a to-be-measured data packet 4 that are included in the to-be-measured data packet set. That is, a sequence of packet arrival times of the four to-be-measured data packets is the to-be-measured data packet 1, the to-be-measured data packet 2, the to-be-measured data packet 3, and the to-be-measured data packet 4. In addition, all the four data packets are based on the QUIC protocol. Assuming that the to-be-measured data packet 4 is the first to-be-measured data packet, the to-be-measured data packet 1, the to-be-measured data packet 2, and the to-be-measured data packet 3 are the second to-be-measured data packets.

In a possible implementation, when obtaining the feature parameter of the to-be-measured data packets, the network quality measurement apparatus further obtains feature identifiers of the to-be-measured data packets. The feature identifiers may include but are not limited to at least one of identifiers such as a service identifier, an application identifier, and a user identifier. The three feature identifiers may respectively correspond to identification results of the service identification, the application granularity identification, and the user identification. The service identifier is used to distinguish different type of services, the application identifier is used to distinguish different applications, and the user identifier is used to distinguish different users. The user identifier may be a MS international Integrated Service Digital Network (ISDN) number (MSISDN), an international mobile subscriber identity (IMSI), a user IP, or the like.

If the to-be-measured data packets are based on an encrypted transmission protocol other than the QUIC protocol, the feature identifiers further include a protocol identifier, used to identify a specific encrypted transmission protocol.

Step S402. Determine a data transmission mode of the to-be-measured data packet set based on the feature parameter of the to-be-measured data packet set.

In a possible implementation, the network quality measurement apparatus may first determine packet type of the to-be-measured data packets based on the feature parameter of the to-be-measured data packets, and then determine the data transmission mode of the to-be-measured data packet set based on the feature parameter and the packet type of the to-be-measured data packets.

The network quality measurement apparatus may determine the packet type of the to-be-measured data packets in the following two manners.

Manner 1. The network quality measurement apparatus may determine the packet type of the to-be-measured data packets based on definitions of the packet type. The packet type may be classified into a quasi request packet, an application data packet, or a quasi acknowledgement packet.

The quasi request packet is a data packet that is sent by a data receive end to a data transmit end and requests to transmit application data and whose packet size is less than a first threshold. The data receive end may be a client, and the data transmit end may be a server. The data receive end may be a server, and the data receive end may be a client. The quasi request packet may be classified into an uplink quasi request packet and a downlink quasi request packet. The uplink quasi request packet may be a request that is for a specific action on a resource of the server and that is initiated by the client to the server. Such a packet occurs after an encrypted handshake message or occurs at the same time as an encrypted handshake message, and is a start of a continuous data transmission. Similarly, the downlink quasi request packet may be a request that is for a specific action on a resource of the client and that is initiated by the server to the client. The quasi request packet is similar to a TCP packet obtained through HTTP GET. The name of the quasi request packet does not constitute a limitation on this embodiment of this application. Other names for describing the essence of the quasi request packet fall within the protection scope of this embodiment of this application.

The application data packet is a data packet that is sent by the data transmit end to the data receive end and carries the application data and whose packet size is greater than a second threshold. The application data packet may be classified into an uplink application data packet and a downlink application data packet, that is, the application data packet is a carrier for continuous data transmission. The application data packet is usually sent after the quasi request packet, and has a typical large packet or full packet feature. In addition, application data packets for a continuous data transmission are generally in a same direction, which is similar to TCP data packets. The second threshold is greater than the first threshold.

The quasi acknowledgement packet is a data packet that is sent by the data receive end to the data transmit end and indicates that the data receive end receives the application data packet and whose packet size is less than a third threshold. That is, the quasi acknowledgement packet is used to acknowledge that the application data packet is received. The quasi acknowledgement packet may be classified into an uplink quasi acknowledgement packet and a downlink quasi acknowledgement packet, that is, the quasi acknowledgement packet is an acknowledgement packet for the application data packet. The quasi acknowledgement packet is sent after the data receive end receives the application data packet, has a typical small packet feature, and has a direction opposite to a direction of the application data packet. In addition, packet quantity distribution feature of the application data packet and the quasi acknowledgement packet may also be used as one of distinguishing methods. The quasi acknowledgement packet is similar to a TCP acknowledgement packet. The name of the quasi acknowledgement packet does not constitute a limitation on this embodiment of this application. Other names for describing the essence of the quasi acknowledgement packet fall within the protection scope of this embodiment of this application. The second threshold is greater than the third threshold. For ease of distinguishing the quasi request packet and the quasi acknowledgement packet, the first threshold is different from the third threshold.

Both the quasi request packet and the quasi acknowledgement packet are data packets sent by the data receive end to the data transmit end. The quasi request packet and the quasi acknowledgement packet may also be distinguished by determining whether a previous data packet of a data packet sent by the data receive end to the data transmit end is the application data packet. If the previous data packet is the application data packet, the data packet sent by the data receive end to the data transmit end is the quasi acknowledgement packet, otherwise, the data packet is the quasi request packet.

The network quality measurement apparatus may define classification principles and usage principles of the quasi request packet, the application data packet, and the quasi acknowledgement packet. For details, refer to Table 2 below.

TABLE 2

| Packet type | Packet type classification principle | Packet type usage principle |
| --- | --- | --- |
| Quasi request packet | First uplink packet/downlink packet whose packet size meets a first threshold | Determine that a transaction or data transmission starts |
| Application data packet | A packet size meets a second threshold, and a packet arrival time sequence meets a continuous and codirectional requirement | Determine payload data sent or received by a client |
| Quasi acknowledgement packet | A packet size meets a third threshold, a packet arrival time sequence meets a requirement, uplink-downlink packet interaction meets a requirement, and a packet direction meets a requirement. | Determine whether payload data is normally received |

Manner 2. The network quality measurement apparatus may set a preset quasi request packet feature parameter, a preset application data packet feature parameter, and a preset quasi acknowledgement packet feature parameter based on Table 2. The packet type of the to-be-measured data packets are determined by matching the feature parameter of the to-be-measured data packets with the preset quasi request packet feature parameter, the preset application data packet feature parameter, and the preset quasi acknowledgement packet feature parameter.

The preset quasi request packet feature parameter may include that the packet direction is uplink and the first threshold. If packet directions of the to-be-measured data packets are uplink and packet sizes of the to-be-measured data packets are less than the first threshold, it may be determined that the feature parameter of the to-be-measured data packets are matched with the preset quasi request packet feature parameter, and the packet type of the to-be-measured data packets are quasi request packets.

The preset application data packet feature parameter may include the second threshold, a first preset packet direction, and a first preset packet arrival time. The first preset packet direction is related to a direction of a packet before or after the to-be-measured data packets, that is, a packet direction of continuous packets. The first preset packet arrival time is deduced based on a packet arrival time of an application data packet that is before a data packet, and has a time difference range with the application data packet that is before the data packet. The second threshold is greater than a first packet size threshold. If the packet directions of the to-be-measured data packets are the same as the first preset direction, that is, the packet directions of the to-be-measured data packets are the same as the direction of the continuous data packets, the packet sizes of the to-be-measured data packets are greater than the second threshold, and packet arrival times of the to-be-measured data packets are later than a packet arrival time of a previous application data packet, which meets the time difference, it may be determined that the feature parameter of the to-be-measured data packets are matched with the preset application data packet feature parameter, and the packet type of the to-be-measured data packets are application data packets.

The preset quasi acknowledgement packet feature parameter may include the third threshold, a second preset packet direction, a second preset packet arrival time, and a preset uplink-downlink packet exchange transmit frequency range. The third threshold is less than the second threshold. The second preset packet direction is opposite to the first preset packet direction. The second preset packet arrival time is deduced based on a packet arrival time of an application data packet that is before a data packet, and has a time difference range with the application data packet that is before the data packet. The preset uplink-downlink packet exchange transmit frequency range describes an interaction frequency between the application data packet and the quasi acknowledgement packet, for example, an interaction frequency between three application data packets and one quasi acknowledgement packet. If the packet sizes of the to-be-measured data packets are less than the third threshold, the packet directions of the to-be-measured data packets are the same as the second preset packet direction, the packet arrival times of the to-be-measured data packet are after the last continuous application data packet, which meets the time difference, and the preset uplink-downlink packet exchange transmit frequency range is met, it may be determined that the feature parameter of the to-be-measured data packets are matched with the preset quasi acknowledgement packet feature parameter, and the packet type of the to-be-measured data packets are quasi acknowledgement packets.

The network quality measurement apparatus may determine the data transmission mode of the to-be-measured data packet set based on the feature parameter and the packet type of the to-be-measured data packets in the following manner. The feature parameter and the packet type of the to-be-measured data packets in the to-be-measured data packet set are matched with a preset data transmission mode determining rule, and the data transmission mode of the to-be-measured data packet sets is determined based on a matching result.

The preset data transmission mode determining rule is obtained by analyzing a plurality of sample quasi request packets, a plurality of sample application data packets, and a plurality of sample quasi acknowledgement packets. A network impairment emulator is erected between the data transmit end and the data receive end, and packets are captured at both the data transmit end and data receive end. Different network feature such as packet loss, out-of-order, and a response may be set in the network impairment emulator. A lost packet, an out-of-order packet, and an acknowledgement packet of a packet, and the like may be clearly known by capturing packets at both ends. The preset data transmission mode determining rule is obtained by performing analysis and abstraction on a basis of a large quantity of labeled samples.

Case 1. The preset data transmission mode determining rule may specify that a data packet set has a packet loss feature. The packet loss feature is that packet numbers of two application data packets with continuous packet arrival times are inconsecutive. For example, a packet number of an application data packet 1 is 4, a packet number of an application data packet 2 is 6, and packet arrival times of the application data packet 1 and the application data packet 2 are continuous (in an embodiment, the application data packet 1 arrives first, and the application data packet 2 arrives by following the application data packet 1). Then, a data packet set including the application data packet 1 and the application data packet 2 has a packet loss feature. It may be understood that one packet loss feature corresponds to one packet loss. If there are a plurality of packet loss feature in the data packet set, packets are lost for a plurality of times in the data packet set. The packet loss feature is determined using a void in a packet number of an application data packet in an uplink or downlink acknowledgement direction.

If the matching result is that the to-be-measured data packet set has the packet loss feature, it is determined that the data transmission mode of the to-be-measured data packet set is a packet loss transmission mode, that is, a packet is lost in the to-be-measured data packet set, to determine the packet loss feature as a measurement index of the network quality measurement. For example, the to-be-measured data packet set includes three application data packets (an application data packet 1, an application data packet 2, and an application data packet 3), the three application data packets have continuous packet arrival times, and the application data packet 2 and the application data packet 3 have discontinuous packet numbers. It may be determined that there is a packet loss feature in the to-be-measured data packet set.

Case 2. The preset data transmission mode determining rule indicates that a data packet set has an out-of-order feature. The out-of-order feature is a packet number of a first application data packet being greater than a packet number of a second application data packet, packet arrival times of the first application data packet and the second application data packet being continuous, and the packet arrival time of the first application data packet being earlier than the packet arrival time of the second application data packet. For example, a packet number of an application data packet 1 is 6, a packet number of an application data packet 2 is 5, and packet arrival times of the application data packet 1 and the application data packet 2 are continuous (in an embodiment, the application data packet 1 arrives first, and the application data packet 2 arrives by following the application data packet 1). Then, a data packet set including the application data packet 1 and the application data packet 2 has an out-of-order feature. It may be understood that one out-of-order feature corresponds to one time of disorder. If there are a plurality of out-of-order feature in the data packet set, disorder occurs for a plurality of times in the data packet set. The out-of-order feature is determined using a sequence of packet numbers of application data packets in an uplink or downlink acknowledgement direction.

If the matching result is that the to-be-measured data packet set has the out-of-order feature, it is determined that the data transmission mode of the to-be-measured data packet set is an out-of-order transmission mode, that is, disorder occurs in the to-be-measured data packet set, to determine the out-of-order feature as the measurement index of the network quality measurement. For example, the to-be-measured data packet set includes three application data packets (an application data packet 1, an application data packet 2, and an application data packet 3), packet arrival times of the three application data packets are continuous (the application data packet 1 arrives first, then the application data packet 2 arrives, and then, the application data packet 3 arrives), and a packet number of the application data packet 2 is greater than a packet number of the application data packet 3. Then, it may be determined that the to-be-measured data packet set has an out-of-order feature.

Case 3. The preset data transmission mode determining rule indicates that a data packet set has a response feature, and the response feature is that there is a quasi acknowledgement packet and an application data packet corresponding to the quasi acknowledgement packet. For example, the data packet set includes three application data packets and one quasi acknowledgement packet, and packet arrival times of the three application data packets and the quasi acknowledgement packet are continuous. Then, it may be determined that the quasi acknowledgement packet and the application data packets corresponding to the quasi acknowledgement packet in the data packet set has the response feature. If the data packet set includes one application data packet and one quasi acknowledgement packet, the application data packet is an application data packet corresponding to the quasi acknowledgement packet. If the data packet set includes a plurality of application data packets and one quasi acknowledgement packet, one of the plurality of application data packets that has the earliest packet arrival time is an application data packet corresponding to the quasi acknowledgement packet. If the data packet set includes one quasi request packet, a plurality of application data packets, and one quasi acknowledgement packet, one of the plurality of application data packets that has a packet arrival time closest to the quasi request packet is an application data packet corresponding to the quasi acknowledgement packet. If there is a quasi acknowledgement packet and an application data packet corresponding to the quasi acknowledgement packet, it may be considered that there is a response feature, and one response feature may correspond to one data transmission response. If there are a plurality of quasi acknowledgement packets in the data packet set, analogy may be performed based on the foregoing several cases.

If the matching result is that the to-be-measured data packet set has the response feature, it is determined that the data transmission mode of the to-be-measured data packet set is a response transmission mode, that is, the to-be-measured data packet set has a data transmission response, to determine the response feature as the measurement index of the network quality measurement. For example, the to-be-measured data packet set includes one quasi request packet, three application data packets (an application data packet 1, an application data packet 2, and an application data packet 3), and one quasi acknowledgement packet in a sequence of packet arrival times. It may be determined that the application data packet 1 is an application data packet corresponding to the quasi acknowledgement packet, and the to-be-measured data packet set has the response feature.

The foregoing three cases may be combined. For example, the to-be-measured data packet set has the packet loss feature and the response feature, and the data transmission mode of the to-be-measured data packet set is the packet loss transmission mode plus the response transmission mode.

In a possible implementation, the network quality measurement apparatus may first sort the to-be-measured data packet set based on the feature parameter of the to-be-measured data packets included in the to-be-measured data packet set, to obtain a to-be-measured data packet sequence, then determine the packet type of the to-be-measured data packets, and finally determine the data transmission mode of the to-be-measured data packet set.

The to-be-measured data packets in the to-be-measured data packet sequence are sorted in ascending order of packet arrival times, and packet directions of the to-be-measured data packets are specified. For example, the to-be-measured data packet sequence includes a to-be-measured data packet 1 (a client→a server), a to-be-measured data packet 2 (a server→a client), and a to-be-measured data packet 3 (a server→a client).

For determining the packet type of the to-be-measured data packets, refer to specific descriptions in the foregoing possible implementation. For determining the data transmission mode of the to-be-measured data packet set, refer to specific descriptions in the foregoing possible implementation.

In a possible implementation, the network quality measurement apparatus may sort the to-be-measured data packet set based on the feature parameter of the to-be-measured data packets included in the to-be-measured data packet set, to obtain a to-be-measured data packet sequence, determine the packet type of the to-be-measured data packets, and finally determine the data transmission mode of the to-be-measured data packet set.

If the data transmission mode of the to-be-measured data packet set cannot be determined in the foregoing manner, a quantity of to-be-measured data packet sets may be increased to determine a data transmission mode of the increased to-be-measured data packet set, or a new to-be-measured data packet set is obtained to determine a data transmission mode of the to-be-measured data packet set.

Step S403. Determine, based on the data transmission mode, the measurement index of the network quality measurement, and cache the feature parameter of the to-be-measured data packet set.

Case 1. If the data transmission mode is the packet loss transmission mode, the network quality measurement apparatus determines the packet loss feature as the measurement index of the network quality measurement. That is, a packet loss rate may be calculated based on the packet loss feature. The packet loss rate is a type of network quality.

Case 2. If the data transmission mode is the out-of-order transmission mode, the network quality measurement apparatus determines the out-of-order feature as the measurement index of the network quality measurement. That is, an out-of-order rate may be calculated based on the out-of-order feature. The out-of-order rate is a type of network quality.

Case 3. If the data transmission mode is the response transmission mode, the network quality measurement apparatus determines the response feature as the measurement index of the network quality measurement. That is, a delay may be calculated based on the response feature. The delay is a type of network quality.

After the data transmission mode of the to-be-measured data packet set is determined, the feature parameter of the to-be-measured data packet set are buffered. That is, the feature parameter of the to-be-measured data packets included in the to-be-measured data packet set are cached. For example, the data transmission mode of the to-be-measured data packet set is the packet loss transmission mode, and the to-be-measured data packet set includes a to-be-measured data packet 1, a to-be-measured data packet 2, a to-be-measured data packet 3, and a to-be-measured data packet 4. The network quality measurement apparatus caches a feature parameter of the to-be-measured data packet 1, a feature parameter of the to-be-measured data packet 2, a feature parameter of the to-be-measured data packet 3, and a feature parameter of the to-be-measured data packet 4. Caching the feature parameter is caching the to-be-measured data packets corresponding to the feature parameter.

In a possible implementation, the network quality measurement apparatus may pertinently cache the feature parameter of the to-be-measured data packets, and caches the feature parameter of the to-be-measured data packets into cache locations corresponding to the feature identifiers of the to-be-measured data packets. It may be understood that the network quality measurement apparatus performs associated caching on to-be-measured data packets having a same feature identifier, for example, performs associated caching on to-be-measured data packets of a same user, and for another example, performs associated caching on to-be-measured data packets of a same service.

Step S404. Perform, based on the measurement index, the network quality measurement on the to-be-measured data packets corresponding to the cached feature parameter.

The network quality measurement apparatus may perform, based on the measurement index, the network quality measurement on all the to-be-measured data packets corresponding to all the cached feature parameter, or may perform, based on the measurement index, the network quality measurement on some of all the to-be-measured data packets corresponding to all the cached feature parameter, or may perform, based on the measurement index, the network quality measurement on a to-be-measured data packet corresponding to a feature parameter cached within a preset time period. It may be understood that the network quality measurement apparatus may perform the network quality measurement on the to-be-measured data packets with different bases, and can improve flexibility and selectivity of the network quality measurement.

The network quality measurement apparatus may obtain to-be-measured data packets having a same feature identifier from the data packets corresponding to the cached feature parameter, and perform the network quality measurement on the to-be-measured data packets having the same feature identifier based on the measurement index. It may be understood that the network quality measurement apparatus may pertinently perform the network quality measurement on to-be-measured data packets having a same service identifier or a same user identifier.

Network quality may include but is not limited to at least one of the delay, the packet loss rate, the out-of-order rate, and the like.

If the data transmission mode is the packet loss transmission mode, the network quality measurement apparatus collects a quantity of packet loss feature in the to-be-measured data packets corresponding to the cached feature parameter, that is, collects a quantity of packet losses in the to-be-measured data packets corresponding to the cached feature parameter. One packet loss feature may correspond to one time of disorder. The packet loss rate is calculated based on the quantity of packet loss feature. The packet loss rate may be calculated by dividing the quantity of packet loss feature by a quantity of application data packets in the to-be-measured data packets corresponding to the cached feature parameter.

If the data transmission mode is the out-of-order transmission mode, the network quality measurement apparatus collects a quantity of out-of-order feature in the to-be-measured data packets corresponding to the cached feature parameter, that is, collects a quantity of out-of-order times in the to-be-measured data packets corresponding to the cached feature parameter. One out-of-order feature may correspond to one time of disorder. The out-of-order rate may be calculated based on the quantity of the out-of-of-order feature. The out-of-order rate may be calculated by dividing the quantity of out-of-order feature by the quantity of the application data packets in the to-be-measured data packets corresponding to the cached feature parameter.

If the data transmission mode is the response transmission mode, the network quality measurement apparatus collects a quantity of response feature in the to-be-measured data packets corresponding to the cached feature parameter, and calculates a packet arrival time difference between a quasi acknowledgement packet in each response feature and an application data packet corresponding to the quasi acknowledgement packet, where the packet arrival time is a data transmission response delay. Finally, a delay is calculated based on the quantity of response feature and each data transmission response delay. That is, the data transmission response delay corresponding to each response feature is accumulated, and the delay is calculated by dividing an accumulated sum by the quantity of response feature.

FIG. 5 is a schematic diagram of a QUIC data transmission principle according to an embodiment of this application. A data transmission response is actually a QUIC data transmission request response delay, is an index similar to a TCP RTT, and samples a specific packet exchange mode, to approximately reflect a RTT of a QUIC packet in transmission. As shown in FIG. 5, a QUIC packet request acknowledgement exchange process includes a quasi acknowledgement packet and a downlink application data packet corresponding to the quasi acknowledgement packet. A time difference between a packet arrival time of the downlink application data packet and a packet arrival time of the quasi acknowledgement packet is a data transmission response delay. It should be noted that a packet number in the QUIC protocol does not represent a total quantity of packets that have been sent by the data transmit end, the data transmit end and the data receive end separately count the packet number, and there is no correspondence. Therefore, there is no correspondence between a packet number of the quasi acknowledgement packet and a packet number of the application data packet corresponding to the quasi acknowledgement packet. A packet loss rate is used to feed back a data transmission packet loss status of a service carried based on QUIC, and may be determined based on a packet number of an application data packet. An out-of-order rate is used to feed back a data transmission out-of-order status of the service carried based on the QUIC, and may be determined based on the packet number of the application data packet.

FIG. 6 is a schematic diagram of a measurement principle in the network quality measurement method according to an embodiment of this application. (1) is a start time of a QUIC connection, (2) is a start time of the first QUIC data transmission transaction, and (3) is a start time of the second QUIC data transmission transaction. A QUIC data transmission transaction starts when a MT sends an uplink quasi request packet. For an uplink service (for example, publishing a picture), after the uplink quasi request packet, the MT sends a server response quasi acknowledgement packet (used to respond to the uplink quasi request packet, and then send an uplink application data packet) and the uplink application data packet. For a downlink service (for example, watching a video), after the uplink quasi request packet, a server sends a client response quasi acknowledgement packet (used to respond to the uplink quasi request packet, and then send a downlink application data packet) and the downlink application data packet. A transaction end point is a quasi acknowledgement packet that is before the MT sends the uplink quasi request packet next time. It may be understood that all the data packets shown in FIG. 6 are cached data packets.

As shown in FIG. 6, an application data packet corresponding to a quasi acknowledgement packet (PKN=2) is QUIC Data (PKN=2), and a packet arrival time difference between the quasi acknowledgement packet (PKN=2) and the application data packet (PKN=2) is a data transmission response delay. If an application data packet (PKN=7) between an application data packet (PKN=6) and an application data packet (PKN=8) is lost, it may be determined that packet loss occurs once. An error occurs in a sequence of packet arrival times of an application data packet (PKN=10) and an application data packet (PKN=9). It may be determined that the two packets are out of order once.

It can be learned from FIG. 6 that, the MT and the server separately count the PKN, and there is no correspondence. It is coincident that the quasi acknowledgement packet (PKN=2) has a same packet number as the application data packet (PKN=2) corresponding to the quasi acknowledgement packet (PKN=2), and this is not representative. Actually, a packet number of a quasi acknowledgement packet is irrelevant to a packet number of an application data packet corresponding to the quasi acknowledgement packet.

Assuming that the preset time period is 0 to 400 seconds. Within this range, the network quality measurement apparatus collects response feature for a total of X times, data transmission response delays are respectively XX milliseconds (ms) for the first time, . . . for the second time, and the like, and a statistical average value is xx ms. Therefore, it is learned that a delay measured this time is xx ms. Within this range, a total of xx packet loss feature are collected. Therefore, it is learned that a packet loss rate measured this time is xx/a quantity of application data packets. Within this range, out-of-order feature for xx times are measured. Therefore, an out-of-order rate measured this time is xx/the quantity of the application data packets.

After the delay, the packet loss rate, and the out-of-order rate are measured, the network quality measurement apparatus may output the measurement results in a form of a graph or text. Specifically, the remote management system shown in FIG. 2 may output the measurement results. The network quality measurement apparatus may also output measurement results of a same service or a same user.

The measurement method in the embodiments of this application is stable and universally applicable. Most of the extracted feature parameter and the determined feature (the packet loss feature, the out-of-order feature, and the response feature) in the embodiments of this application are transport layer feature, and only a field of a QUIC header is extracted. Therefore, dependency on a version of the QUIC protocol is low. Even through the QUIC version is frequently upgraded and reconstructed, the method is not greatly affected. For example, a relatively large change in a packet format in QUIC version upgrades for a plurality of times does not affect the embodiments of this application. Second, the method does not distinguish service type such as browsing, video, and voice over Internet Protocol (VOIP), and a same calculation method is used for all type of data packets. Therefore, the method is universally applicable to various internet services and applications.

The embodiment shown in FIG. 4 is described for the QUIC protocol. The embodiments of this application may be further applied to network quality measurement based on another encrypted transmission protocol, for example, HTTP 2.0. A difference between HTTP 2.0 and QUIC lies in that the former is based on TCP and the latter is based on UDP. The embodiment shown in FIG. 4 may be directly migrated to network quality measurement based on HTTP 2.0. Only an HTTP 2.0 bearer protocol needs to be identified, no procedure needs to be added, but obtained feature parameter and parameter used for feature identification are different. In addition, HTTP 2.0 is an application layer protocol based on TCP, and in which a packet response relationship can be directly obtained. In other words, in HTTP 2.0, a response packet can be accurately obtained to replace the quasi acknowledgement packet, and the quasi request packet and the application data packet are still constructed according to the embodiments of this application. In the embodiments of this application, a data transmission encryption problem is resolved by determining the data transmission mode using the quasi request packet, the application data packet, and the quasi acknowledgement packet such that service quality can be further evaluated.

The following describes the network quality measurement apparatus provided in the embodiments of this application. The network quality measurement apparatus is configured to implement the method embodiment shown in FIG. 4. For a part that is not described in the apparatus embodiment, refer to specific descriptions in the method embodiment.

Figure 7:
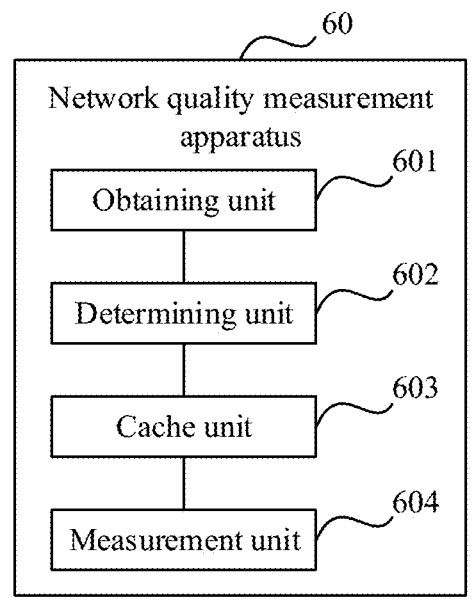
FIG. 7 is a schematic diagram of a logical structure of a network quality measurement apparatus according to an embodiment of this application.

FIG. 7 is a schematic diagram of a logical structure of a network quality measurement apparatus according to an embodiment of this application. The network quality measurement apparatus 60 includes an obtaining unit 601, a determining unit 602, a cache unit 603, and a measurement unit 604.

The obtaining unit 601 is configured to obtain feature parameter of a to-be-measured data packet set, where the to-be-measured data packet set is in a packet flow and is based on an encrypted transmission protocol, the to-be-measured data packet set includes at least two to-be-measured data packets, and the feature parameter are parameter read from headers of the to-be-measured data packets based on the encrypted transmission protocol.

The determining unit 602 is configured to determine a data transmission mode of the to-be-measured data packet set based on the feature parameter of the to-be-measured data packet set.

The determining unit 602 is further configured to determine, based on the data transmission mode, a measurement index of network quality measurement.

The cache unit 603 is configured to cache the feature parameter of the to-be-measured data packet set.

The measurement unit 604 is configured to perform, based on the measurement index, the network quality measurement on the to-be-measured data packets corresponding to the cached feature parameter.

In an implementation, the encrypted transmission protocol is the QUIC protocol.

When the determining unit 602 is configured to determine the data transmission mode of the to-be-measured data packet set based on the feature parameter of the to-be-measured data packet set, the determining unit 602 is further configured to determine packet type of the to-be-measured data packets based on the feature parameter of the to-be-measured data packets, and determine the data transmission mode of the to-be-measured data packet set based on the feature parameter of the to-be-measured data packets in the to-be-measured data packet set and the packet type of the to-be-measured data packets.

The packet type is a quasi request packet, an application data packet, or a quasi acknowledgement packet, the quasi request packet is a data packet that is sent by a data receive end to a data transmit end and requests to transmit application data and whose packet size is less than a first threshold, the application data packet is a data packet that is sent by the data transmit end to the data receive end and carries the application data and whose packet size is greater than a second threshold, the quasi acknowledgement packet is a data packet that is sent by the data receive end to the data transmit end and indicates that the data receive end receives the application data packet and whose packet size is less than a third threshold, and the first threshold and the third threshold are less than the second threshold.

In an implementation, when the determining unit 602 is configured to determine the data transmission mode of the to-be-measured data packet set based on the feature parameter of the to-be-measured data packets in the to-be-measured data packet set and the packet type of the to-be-measured data packets, the determining unit 602 is further configured to match the feature parameter of the to-be-measured data packets in the to-be-measured data packet set and the packet type of the to-be-measured data packets with a preset data transmission mode determining rule, and determine the data transmission mode of the to-be-measured data packet set based on a matching result.

In an implementation, the preset data transmission mode determining rule indicates that a data packet set has a packet loss feature, and the packet loss feature is that packet numbers of two application data packets with continuous packet arrival times are inconsecutive.

When the determining unit 602 is configured to determine the data transmission mode of the to-be-measured data packet set based on the matching result, the determining unit 602 is further configured to determine that the data transmission mode of the to-be-measured data packet set is a packet loss transmission mode if the matching result is that the to-be-measured data packet set has the packet loss feature.

When the determining unit 602 is configured to determine, based on the data transmission mode, the measurement index of the network quality measurement, the determining unit 602 is further configured to determine the packet loss feature as the measurement index of the network quality measurement in the packet loss transmission mode.

In an implementation, when the measurement unit 604 is configured to perform, based on the measurement index, the network quality measurement on the to-be-measured data packets corresponding to the cached feature parameter, the measurement unit 604 is further configured to collect a quantity of packet loss feature in the to-be-measured data packets corresponding to the cached feature parameter, and calculate a packet loss rate based on the quantity of packet loss feature.

In an implementation, the preset data transmission mode determining rule indicates that a data packet set has an out-of-order feature, and the out-of-order feature is a packet number of a first application data packet is greater than a packet number of a second application data packet, packet arrival times of the first application data packet and the second application data packet are continuous, and the packet arrival time of the first application data packet is earlier than the packet arrival time of the second application data packet.

When the determining unit 602 is configured to determine the data transmission mode of the to-be-measured data packet set based on the matching result, the determining unit 602 is further configured to determine that the data transmission mode of the to-be-measured data packet set is an out-of-order transmission mode if the matching result is that the to-be-measured data packet set has the out-of-order feature.

When the determining unit 602 is configured to determine, based on the data transmission mode, the measurement index of the network quality measurement, the determining unit 602 is further configured to determine the out-of-order feature as the measurement index of the network quality measurement in the out-of-order transmission mode.

In an implementation, when the measurement unit 604 is configured to perform, based on the measurement index, the network quality measurement on the to-be-measured data packets corresponding to the cached feature parameter, the measurement unit 604 is further configured to collect a quantity of out-of-order feature in the to-be-measured data packets corresponding to the cached feature parameter, and calculate an out-of-order rate based on the quantity of out-of-order feature.

In an implementation, the preset data transmission mode determining rule indicates that a data packet set has a response feature, and the response feature is that there is a quasi acknowledgement packet and an application data packet corresponding to the quasi acknowledgement packet.

When the determining unit 602 is configured to determine the data transmission mode of the to-be-measured data packet set based on the matching result, the determining unit 602 is further configured to determine that the data transmission mode of the to-be-measured data packet set is a data transmission response mode if the matching result is that the to-be-measured data packet set has the response feature.

When the determining unit 602 is configured to determine, based on the data transmission mode, the measurement index of the network quality measurement, the determining unit 602 is further configured to determine the response feature as the measurement index of the network quality measurement in the data transmission response mode.

In an implementation, when the measurement unit 604 is configured to perform, based on the measurement index, the network quality measurement on the to-be-measured data packets corresponding to the cached feature parameter, the measurement unit 604 is further configured to collect a quantity of response feature in the to-be-measured data packets corresponding to the cached feature parameter, calculate a packet arrival time difference between the quasi acknowledgement packet and the application data packet corresponding to the quasi acknowledgement packet in the response feature, and calculate a delay based on the quantity of response feature and the packet arrival time difference.

In an implementation, the at least two to-be-measured data packets include a first to-be-measured data packet and at least one second to-be-measured data packet, the at least two to-be-measured data packets have continuous packet arrival times, and a packet arrival time of the at least one second to-be-measured data packet is earlier than a packet arrival time of the first to-be-measured data packet.

In an implementation, the feature parameter include at least one of a packet size, a packet direction, a packet number, a packet number length, a packet arrival time, and an uplink-downlink packet exchange transmit frequency.

In an implementation, when the measurement unit 604 is configured to perform, based on the measurement index, the network quality measurement on the to-be-measured data packets corresponding to the cached feature parameter, the measurement unit 604 is further configured to perform, based on the measurement index, the network quality measurement on all the to-be-measured data packets corresponding to all the cached feature parameter, perform, based on the measurement index, the network quality measurement on some of all the to-be-measured data packets corresponding to all the cached feature parameter, or perform, based on the measurement index, the network quality measurement on a to-be-measured data packet corresponding to a feature parameter cached within a preset time period.

In an implementation, the obtaining unit 601 is further configured to obtain feature identifiers of the to-be-measured data packets, where the feature identifiers include at least one of a service identifier, an application identifier, and a subscriber identifier.

When the cache unit 603 is configured to cache the feature parameter of the to-be-measured data packet set, the cache unit 603 is further configured to cache the feature parameter of the to-be-measured data packets into cache locations corresponding to the feature identifiers of the to-be-measured data packets.

In an implementation, when the measurement unit 604 is configured to perform, based on the measurement index, the network quality measurement on the to-be-measured data packets corresponding to the cached feature parameter, the measurement unit 604 is further configured to obtain to-be-measured data packets having a same feature identifier from the to-be-measured data packets corresponding to the cached feature parameter, and perform, based on the measurement index, the network quality measurement on the to-be-measured data packets having the same feature identifier.

The obtaining unit 601 is configured to perform step S401 in the embodiment shown in FIG. 4, and may correspond to the data collection system shown in FIG. 2, or may correspond to the data processing system shown in FIG. 2. The determining unit 602 is configured to perform step S402 in the embodiment shown in FIG. 4, is further configured to perform step S403 in the embodiment shown in FIG. 4, in an embodiment, determine, based on the data transmission mode, the measurement index of the network quality measurement, and may correspond to the data processing system shown in FIG. 2. The cache unit 603 is configured to perform step S403 in the embodiment shown in FIG. 4, in an embodiment, cache the feature parameter of the to-be-measured data packet set. The measurement unit 604 is configured to perform step S404 in the embodiment shown in FIG. 4, and may correspond to the data processing system shown in FIG. 2. For specific implementation processes of the foregoing units, refer to specific descriptions of the embodiment shown in FIG. 4, and details are not described herein again.

Figure 8:
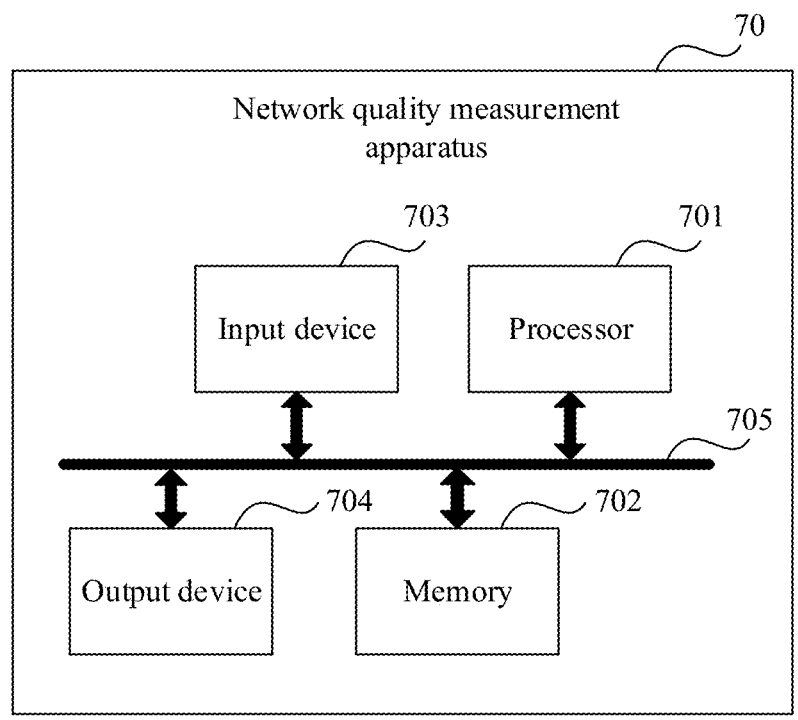
FIG. 8 is a schematic diagram of a physical structure of a network quality measurement apparatus according to an embodiment of this application.

FIG. 8 is a schematic diagram of a physical structure of a network quality measurement apparatus according to an embodiment of this application. The network quality measurement apparatus 70 may include a processor 701 and a memory 702, and may further include an input device 703 and an output device 704. The components may be connected to each other using a bus 705, or may be connected in another manner. Related functions implemented by the obtaining unit 601, the determining unit 602, and the measurement unit 604 shown in FIG. 6 may be implemented by one or more processors 701. The cache unit 603 shown in FIG. 6 may be implemented using the memory 702.

The processor 701 may include one or more processors, for example, include one or more central processing units (CPU) or one or more graphics processing units (GPUs). When the processor is one CPU, the CPU may be a single-core CPU or a multi-core CPU. Applied to this embodiment of this application, the processor 701 is configured to perform steps S401, S402, and S404, and determine, based on the data transmission mode, the measurement index of the network quality measurement in step S403 in the embodiment shown in FIG. 4. For details, refer to the descriptions in the embodiment shown in FIG. 4. Details are not described herein again. The processor 701 may be configured to implement the data processing system shown in FIG. 2.

The memory 702 includes but is not limited to a random-access memory (RAM), a read-only memory (ROM), an erasable programmable read-only memory (EPROM), or a compact disc read-only memory (CD-ROM). The memory 702 is configured to store related program code and data. Applied to this embodiment of this application, the memory 702 is further configured to cache feature parameter and data packets, that is, perform step S403 in the embodiment shown in FIG. 4, in an embodiment, cache the feature parameter of the to-be-measured data packet set.

The input device 703 may include but is not limited to a display screen, a stylus, a keyboard, a mouse, a microphone, and the like, and is configured to receive an input operation of a user. Applied to this embodiment of this application, the input device 703 is configured to obtain a to-be-measured data packet.

The output device 704 may include but is not limited to a display screen, an acoustic device, a loudspeaker, and the like, and is configured to output an audio file, a video file, an image file, and the like. Applied to this embodiment of this application, the output device 704 is configured to output measured network quality, that is, output a packet loss rate, an out-of-order rate, and a delay.

It may be understood that FIG. 8 shows only a simplified design of the network quality measurement apparatus. During actual application, the network quality measurement apparatus may also include other necessary components, including but not limited to any quantity of transceivers, communications units, and the like, and all devices that can implement this application shall all fall within the protection scope of this application.

A person of ordinary skill in the art may understand that all or some of the processes of the methods in the embodiments may be completed by a computer program instructing relevant hardware. The program may be stored in a computer-readable storage medium. When the program is executed, the processes of the method embodiments are performed. The foregoing storage medium includes any medium that can store program code, such as a ROM, a RAM, a magnetic disk, or an optical disc. Therefore, another embodiment of this application provides a computer-readable storage medium. The computer-readable storage medium stores an instruction, and when the instruction is run on a computer, the computer is enabled to perform the methods in the foregoing aspects.

Another embodiment of this application further provides a computer program product including an instruction. When the computer program product is run on a computer, the computer is enabled to perform the methods in the foregoing aspects.

A person of ordinary skill in the art may be aware that, in combination with the examples described in the embodiments disclosed in this application, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the foregoing apparatus embodiment is merely an example. For example, division into the units is merely logical function division and may be other division in actual implementation. For example, a plurality of units or components may be combined or integrated into another system, or some feature may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

All or some of the foregoing embodiments may be implemented using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedures or functions according to the embodiments of the present disclosure are all or partially generated. The computer may be a general-purpose computer, a dedicated computer, a computer network, or other programmable apparatuses. The computer instruction may be stored in a computer-readable storage medium, or may be transmitted using the computer-readable storage medium. The computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid-state drive (SSD)), or the like.

What is claimed is:

1. A network quality measurement method, comprising:
obtaining a first feature parameter of a to-be-measured data packet set from headers of the to-be-measured data packet set, wherein the to-be-measured data packet set comprises to-be-measured data packets, and wherein the to-be-measured data packets are configured to be transmitted using an encrypted transmission protocol;
determining, based on the first feature parameter, a data transmission mode of the to-be-measured data packet set from a plurality of data transmission modes, wherein the plurality of data transmission modes comprises a packet loss transmission mode, an out-of-order transmission mode, and a response transmission mode;
determining, based on the data transmission mode, a measurement index of network quality measurement; and
performing, based on the measurement index, the network quality measurement on the to-be-measured data packets.

2. The network quality measurement method of claim 1, wherein the encrypted transmission protocol is a Quick User Data Packet Internet Connections (QUIC) protocol, and wherein determining the data transmission mode comprises:
obtaining a second feature parameter of the to-be-measured data packet set;
determining, based on the second feature parameter, packet types of the to-be-measured data packets, wherein the packet types comprise a quasi request packet from a data receive end to a data transmit end that requests to transmit application data and comprises a first packet size less than a first threshold, an application data packet from the data transmit end to the data receive end that carries the application data and comprises a second packet size greater than a second threshold, or a quasi acknowledgement packet from the data receive end to the data transmit end that indicates the data receive end receives the application data packet and comprises a third packet size less than a third threshold, and wherein the first threshold and the third threshold are less than the second threshold; and
determining, based on the first feature parameter, the second feature parameter, and the packet types, the data transmission mode.

3. The network quality measurement method of claim 2, wherein determining the data transmission mode further comprises:
matching the second feature parameter and the packet types of the to-be-measured data packets with a preset data transmission mode determining rule; and
determining, based on a matching result of the matching, the data transmission mode.

4. The network quality measurement method of claim 3, wherein the preset data transmission mode determining rule indicates that a data packet set has a packet loss feature indicating whether packet numbers of two application data packets with continuous packet arrival times are inconsecutive, wherein determining the data transmission mode further comprises determining that the data transmission mode is the packet loss transmission mode when the to-be-measured data packet set has the packet loss feature, and wherein determining the measurement index of network quality measurement comprises determining the packet loss feature as the measurement index of the network quality measurement in the packet loss transmission mode.

5. The network quality measurement method of claim 4, wherein performing the network quality measurement on the to-be-measured data packets comprises:
collecting a quantity of packet loss features in the to-be-measured data packets; and
calculating, based on the quantity of packet loss features, a packet loss rate.

6. The network quality measurement method of claim 3, wherein the preset data transmission mode determining rule indicates that a data packet set has an out-of-order feature when a packet number of a first application data packet is greater than a packet number of a second application data packet, packet arrival times of the first application data packet and the second application data packet are continuous, and the packet arrival time of the first application data packet is earlier than the packet arrival time of the second application data packet, wherein determining the data transmission mode further comprises determining that the data transmission mode is the out-of-order transmission mode when the matching result shows that the to-be-measured data packet set has the out-of-order feature, and wherein determining the measurement index of the network quality measurement comprises determining the out-of-order feature as the measurement index of the network quality measurement in the out-of-order transmission mode.

7. The network quality measurement method of claim 6, wherein performing the network quality measurement on the to-be-measured data packets comprises:
collecting a quantity of out-of-order features in the to-be-measured data packets; and
calculating, based on the quantity of out-of-order features, an out-of-order rate.

8. The network quality measurement method of claim 3, wherein the preset data transmission mode determining rule indicates that a data packet set has a response feature comprising the quasi acknowledgement packet and the application data packet, wherein determining the data transmission mode further comprises determining that the data transmission mode is the response transmission mode when the matching result shows that the to-be-measured data packet set has the response feature, and wherein determining the measurement index of network quality measurement comprises determining the response feature as the measurement index of the network quality measurement in the response transmission mode.

9. The network quality measurement method of claim 8, wherein performing the network quality measurement on the to-be-measured data packets comprises:
collecting a quantity of response features in the to-be-measured data packets;

calculating a packet arrival time difference between the quasi acknowledgement packet and the application data packet in the response feature; and calculating, based on the quantity of response features and the packet arrival time difference, a delay.

10. The network quality measurement method of claim 1, wherein the to-be-measured data packets comprise a first to-be-measured data packet and a second to-be-measured data packet, wherein packet arrival times of the to-be-measured data packets are continuous, and wherein a packet arrival time of the second to-be-measured data packet is earlier than a packet arrival time of the first to-be-measured data packet.

11. The network quality measurement method of claim 1, wherein the first feature parameter comprises at least one of a packet size, a packet direction, a packet number, a packet number length, a packet arrival time, or an uplink-downlink packet exchange transmit frequency.

12. The network quality measurement method of claim 1, wherein performing the network quality measurement on the to-be-measured data packets comprises:

performing, based on the measurement index, the network quality measurement on all of the to-be-measured data packets;

performing, based on the measurement index, the network quality measurement on some of the to-be-measured data packets; or performing, based on the measurement index, the network quality measurement on a to-be-measured data packet corresponding to a third feature parameter cached within a preset time period.

13. The network quality measurement method of claim 1, further comprising:

obtaining feature identifiers of the to-be-measured data packets comprising at least one of a service identifier, an application identifier, or a user identifier; and caching a second feature parameter of the to-be-measured data packets into cache locations corresponding to the feature identifiers.

14. The network quality measurement method of claim 13, wherein performing the network quality measurement on the to-be-measured data packets comprises:

obtaining a quantity of to-be-measured data packets having a same feature identifier as the to-be-measured data packets; and performing, based on the measurement index, the network quality measurement on the quantity of to-be-measured data packets.

15. A network quality measurement apparatus, comprising:

a processor; and a memory coupled to the processor and storing instructions that, when executed by the processor, cause the network quality measurement apparatus to be configured to:

obtain a first feature parameter of a to-be-measured data packet set from headers of the to-be-measured data packet set, wherein the to-be-measured data packet set comprises to-be-measured data packets, and wherein the to-be-measured data packets are configured to be transmitted using an encrypted transmission protocol;

determine, based on the first feature parameter, a data transmission mode of the to-be-measured data packet set from a plurality of data transmission modes, wherein the plurality of data transmission modes comprises a packet loss transmission mode, an out-of-order transmission mode, and a response transmission mode;

determine, based on the data transmission mode, a measurement index of network quality measurement; and perform, based on the measurement index, the network quality measurement.

16. The network quality measurement apparatus of claim 15, wherein the encrypted transmission protocol is a Quick User Data Packet Internet Connections (QUIC) protocol, and wherein the instructions further cause the network quality measurement apparatus to be configured to:

obtain a second feature parameter of the to-be-measured data packet set;

determine, based on the second feature parameter, packet types of the to-be-measured data packets, wherein the packet types comprise a quasi request packet from a data receive end to a data transmit end that requests to transmit application data and comprises a first packet size less than a first threshold, an application data packet from the data transmit end to the data receive end that carries the application data and comprises a second packet size greater than a second threshold, or a quasi acknowledgement packet from the data receive end to the data transmit end that indicates the data receive end receives the application data packet and comprises a third packet size less than a third threshold, and wherein the first threshold and the third threshold are less than the second threshold; and determine, based on the first feature parameter, the second feature parameter, and the packet types, the data transmission mode.

17. A computer program product comprising computer-executable instructions for storage on a non-transitory computer-readable medium that, when executed by a processor, cause a network quality measurement apparatus to:

obtain a first feature parameter of a to-be-measured data packet set from headers of the to-be-measured data packet set, wherein the to-be-measured data packet set comprises to-be-measured data packets, and wherein the to-be-measured data packets are configured to be transmitted using an encrypted transmission protocol;

determine, based on the first feature parameter, a data transmission mode of the to-be-measured data packet set from a plurality of data transmission modes, wherein the plurality of data transmission modes comprises a packet loss transmission mode, an out-of-order transmission mode, and a response transmission mode;

determine, based on the data transmission mode, a measurement index of network quality measurement; and perform, based on the measurement index, the network quality measurement on the to-be-measured data packets.

18. The computer program product of claim 17, wherein the encrypted transmission protocol is a Quick User Data Packet Internet Connections (QUIC) protocol, and wherein the instructions further cause the network quality measurement apparatus to:

obtain a second feature parameter of the to-be-measured data packet set;

determine, based on the second feature parameter, packet types of the to-be-measured data packets, wherein the packet types comprise a quasi request packet from a data receive end to a data transmit end that requests to transmit application data and comprises a first packet size less than a first threshold, an application data packet from the data transmit end to the data receive end that carries the application data and comprises a second packet size greater than a second threshold, or a quasi acknowledgement packet from the data receive end to the data transmit end that indicates the data receive end receives the application data packet and comprises a third packet size less than a third threshold, and wherein the first threshold and the third threshold are less than the second threshold; and determine, based on the first feature parameter, the second feature parameter, and the packet types, the data transmission mode.

19. The computer program product of claim 18, wherein the instructions further cause the network quality measurement apparatus to:

match the second feature parameter and the packet types of the to-be-measured data packets with a preset data transmission mode determining rule; and determine, based on a matching result, the data transmission mode.

20. The computer program product of claim 19, wherein the preset data transmission mode determining rule indicates that a data packet set has a packet loss feature indicating whether packet numbers of two application data packets with continuous packet arrival times are inconsecutive, and wherein the instructions further cause the network quality measurement apparatus to:

determine that the data transmission mode is the packet loss transmission mode when the to-be-measured data packet set has the packet loss feature; and determine the packet loss feature as the measurement index of the network quality measurement in the packet loss transmission mode.

* * * * *